Figure 1:
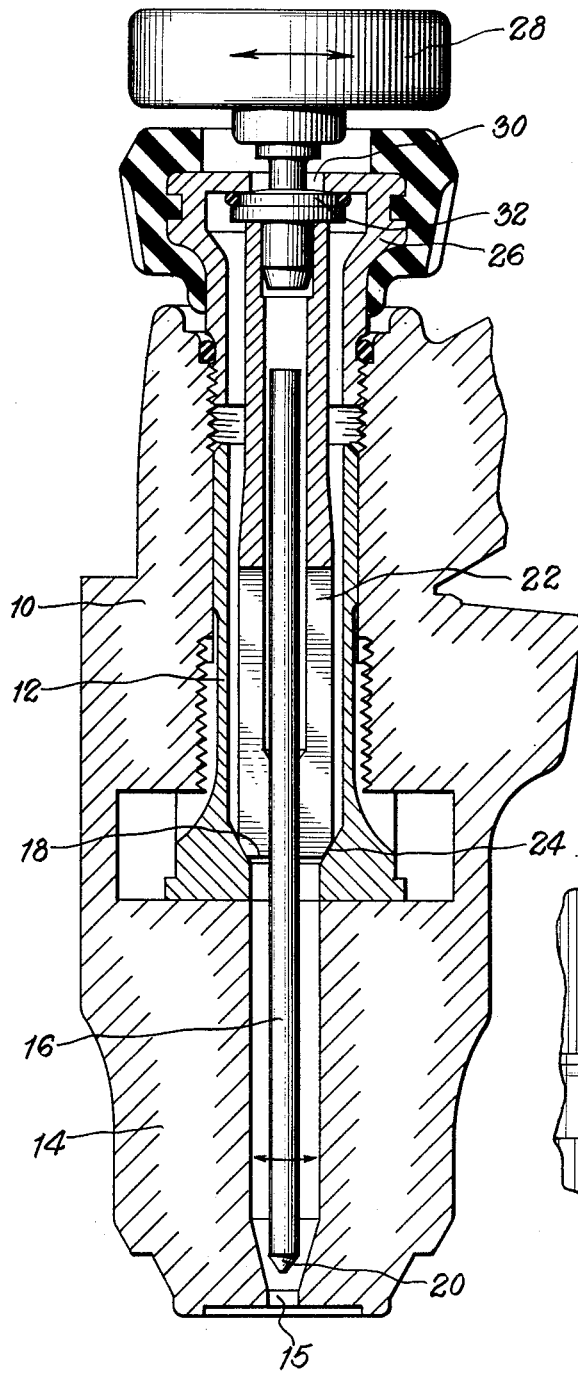

Dec. 18, 1962

C. W. HILL ETAL 3,069,532

ARC TORCH ELECTRODE CENTERING

Filed Oct. 4, 1957

2 Sheets-Sheet 1

INVENTORS
CLIFFORD W. HILL
WILLIAM J. BLANCHARD, SR.
KENNETH E. FISKEN

BY Richard S. Shreve Jr.

ATTORNEY

Dec. 18, 1962 C. W. HILL ETAL 3,069,532
ARC TORCH ELECTRODE CENTERING
Filed Oct. 4, 1957 2 Sheets-Sheet 2

Collet Seat

INVENTORS
CLIFFORD W. HILL
WILLIAM J. BLANCHARD, SR.
KENNETH E. FISKEN
BY Richard S. Shreve Jr
ATTORNEY ID  United States Patent Office 3,069,532
Patented Dec. 18, 1962

3,069,532
ARC TORCH ELECTRODE CENTERING
Clifford W. Hill, Mountainside, William J. Blanchard, Sr., South Amboy, and Kenneth E. Fisken, Colonia, N.J., assignors to Union Carbide Corporation, a corporation of New York
Filed Oct. 4, 1957, Ser. No. 688,169
3 Claims. (Cl. 219—130)

This invention relates to arc torch electrode centering, and more particularly to pivotal mounting of an electrode intermediate its ends in a gas shielded arc torch for accurately centering the arcing tip thereof with respect to the arc constricting orifice of the gas directing nozzle.

When cutting metals with the arc torch disclosed in the copending application of Kane and Hill, Serial No. 596,185, now Patent No. 2,858,412, it is essential that the electrode be positively centered with respect to the constricted outlet orifice in order to maintain the desired high quality of the resulting cuts. If the electrode is not positively centered, the arc is off center with respect to the constricted outlet orifice and the column of cutting gas is disrupted with a resulting impairment of cut quality. This problem also applies to welding, and other arc torch operations.

Accurate centering of the electrode is also necessary to eliminate double-arcing, that is, arcing of the main current as distinguished from the pilot-arc current from the electrode to the constricted outlet orifice and then to the workpiece. If the electrode is accurately centered, the main current arcs from the electrode directly to the workpiece. In the case of improper centering of the electrode, double-arcing occurs at the start of the cutting or welding operation and usually results in damage to the constricted outlet orifice.

The ceramic insulating liner of Serial No. 596,185, now Patent No. 2,858,412, was designed to provide a fixed degree of electrode centering. However, this design requires very close dimensional tolerances to be maintained in the various torch parts, and also careful selection of parts when the torches are assembled, to achieve the required degree of electrode centering. It has been difficult to produce the parts to the required tolerances using standard production equipment and procedures.

Because of poor electrode centering, operators have frequently had to resort to rotation of the electrode and collet and, in some case, even to bending of the electrode. However, these time consuming procedures have not resulted in sufficiently accurate centering, in many instances, to produce the desired high quality cuts and eliminate double-arcing.

It is therefore the main object of the present invention to avoid the above difficulties and to provide a simple means of manually adjusting the electrode to accurately center the arcing tip thereof with the constricted orifice of the nozzle.

According to the present invention the torch is provided with means centered in the lower portion of the torch bore for pivotally mounting the electrode intermediate its ends for universal movement through small angles within the confines of the torch bore whereby movement of the top of the electrode in one direction moves the arcing tip thereof in the opposite direction to center said arcing tip with respect to the constricted orifice of the torch, and means are provided for locking said electrode in such centered position.

Preferably the pivotal mounting means comprises a collet seated near the bottom of the electrode holder and actuated by a knob screwed into the body. Preferably the collet has a handle passing through a large orifice in the knob for tilting the collet on its seat.

Figure 2:
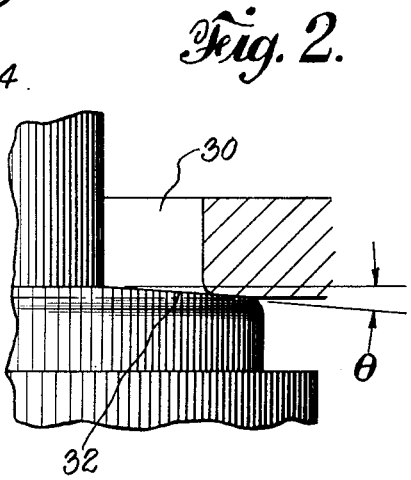
Figure 3:
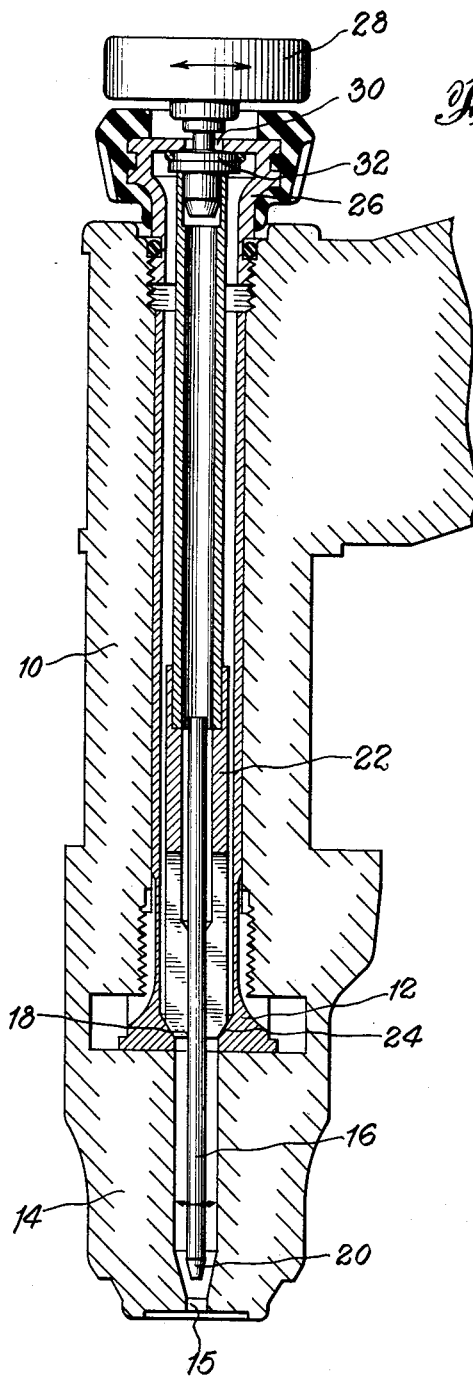
Figure 4:
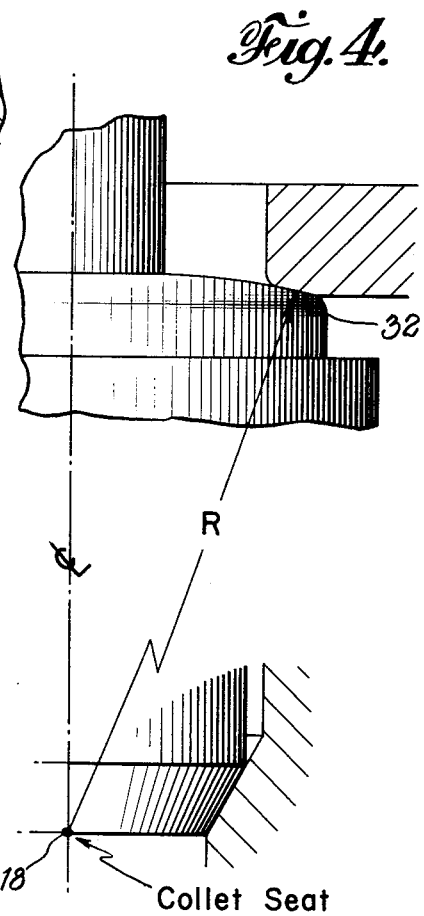

In the drawings:
FIG. 1 is a vertical section through an arc torch provided with electrode centering means according to the preferred embodiment of the present invention;
FIG. 2 is an enlarged fragment of FIG. 1;
FIG. 3 is a vertical section through a modification; and
FIG. 4 is a diagrammatic enlargement of FIG. 3.

The torch shown in the drawing comprises a body 10 having a bore receiving an electrode holder 12. A gas directing nozzle 14 is mounted below the holder 12 and is provided with an arc constricting orifice 15. A rigid electrode 16 is pivotally mounted as at 18 intermediate its ends near the bottom of the body bore for universal movement through small angles within the confines of the bore whereby movement of the top of the electrode in one direction moves the arcing tip 20 thereof in the opposite direction to center the tip 20 with respect to the constricted orifice 15.

In the form shown, the pivoting means comprises a collet 22 engaging a seat 24 near the bottom of the electrode holder 12, and urged thereagainst by a knob 26 or collet release nut screwed into the top of the body 10. The collet 22 has a handle 28 which extends through a large aperture 30 in the knob 26. The handle 28 has an internal shoulder 32 the top edge of which bears against the underside of the knob 26. These surfaces have a taper of the order of 2 degrees, as shown by the angle $\theta$ in FIGURE 2. This permits both rotational and lateral movement of the handle 28 with respect to the knob 26 to the extent of the clearance between the stem of handle 28 and the central drilling 30 in the knob 26.

To center the electrode 16 with respect to the orifice 15, the collet release nut 26 is loosened slightly. Knob 28 may then be rotated or moved laterally as required to exactly center the electrode. Since the inside diameter of the constricted outlet orifice is usually only slightly larger than the diameter of the electrode, a skilled operator can accurately judge when the electrode is centered. Another means of testing for accurate centering of the electrode is to turn the shielding gas on, then turn the high frequency on, and observe the pattern of high-frequency arcing between the end of the electrode and the inside of the constricted outlet orifice. If the high-frequency arcing is uniform throughout the full 360°, there is very accurate centering of the electrode. When the desired electrode position is obtained, the collet release nut 26 is tightened to lock the handle 28 and collet 22 in position and prevent further movement of the electrode.

The tapered collet design shown in FIG. 1 and the stepdown two-piece collet design shown in FIG. 3 permit greater latitude of movement of the electrode by means of the decreased outside diameter of the collet at the stem contacting end.

The electrode centering devices made with a 2 degree taper on the collet release nut 26 and the shoulder 32 function satisfactorily both for machine and manual torches. However, there is some possibility that it might be advantageous to use different angles for the electrode centering devices used for machine and manual torches in order to gain maximum freedom of movement for centering of the electrode in each case. Ideally, the 2 degree tapered surface should be replaced by a spherical radius with a radius R, FIG. 4, equal to the distance from the collet seat to the present 2 degree tapered surface. This of course requires different radii for machine and manual torches. The tapered surface has been adopted because of lower manufacturing costs and operates satisfactorily since, within the limited movement, the chord and arc distances are almost identical.

What is claimed is:
1. In a gas shielded arc torch comprising a torch body having a bore adapted to receive a rigid electrode, a gas directing nozzle below said bore and having an orifice small enough to constrict the arc from the electrode, means centered in the lower portion of said bore for pivotally mounting said electrode intermediate its ends for universal movement through small angles within the confines of said bore, means for moving the top of the electrode in one direction about such pivotal mounting and the arcing tip thereof in the opposite direction to center said arcing tip with respect to said constricted orifice, and means for locking said electrode in such centered position.

2. In a gas shielded arc torch comprising a torch body, an electrode holder carried by said torch body, a gas directing nozzle extending below said electrode holder and having an orifice small enough to constrict the arc from the electrode, means for pivotally mounting the electrode in said holder for movement through an angle in a radial plane, means for moving the top of the electrode in one direction about such pivotal mounting and the arcing tip thereof in the opposite direction to center the same with respect to the nozzle orifice, and means for locking said electrode in such centered position.

3. In a gas shielded arc torch comprising a torch body, an electrode holder in said torch body having a seat near the lower end thereof, a gas directing nozzle below said electrode holder having an orifice small enough to constrict the arc from said electrode, a collet in said electrode holder engaging said seat for gripping an electrode intermediate its ends, a knob screwed into the upper end of said holder and retractable to release said collet, a handle passing through a larger aperture in said knob for tilting said collet on said seat to center the arcing tip of the electrode with said constricted nozzle orifice, said knob being reversely operated to cause said collet to grip said electrode and lock it in centered position.

References Cited in the file of this patent

UNITED STATES PATENTS

| | | |
|---|---|---|
| 2,014,226 | Catlett | Sept. 10, 1935 |
| 2,307,553 | Weller | Jan. 5, 1943 |
| 2,358,158 | Gibbert | Sept. 12, 1944 |
| 2,468,806 | Pilia | May 3, 1949 |
| 2,833,544 | Blades | May 6, 1958 |
| 2,858,412 | Kane et al. | Oct. 28, 1958 |
| 2,868,955 | Brashear | Jan. 13, 1959 |